June 10, 1930.  A. GAUTHIER  1,763,580

WHEEL FOR VEHICLES

Filed July 31, 1928

Inventor
Andre Gauthier
By his Attorneys
Ruege, Boyee & Bakelar

Patented June 10, 1930

1,763,580

UNITED STATES PATENT OFFICE

ANDRÉ GAUTHIER, OF VILLEPAUCHE, FRANCE

WHEEL FOR VEHICLES

Application filed July 31, 1928, Serial No. 296,466, and in France August 1, 1927.

This invention relates to improvements in vehicle wheels, the principal object of the invention being to provide an improved wheel of flexible construction by means of which solid tires may be used without sacrifice of elasticity and riding comfort, and which wheel is comparatively simple in construction and inexpensive to manufacture.

With the foregoing and other objects in view, the invention consists in the novel features of construction and combination of parts hereinafter more fully described, and particularly pointed out in the claim.

In the drawing accompanying this specification,

Figure 1:
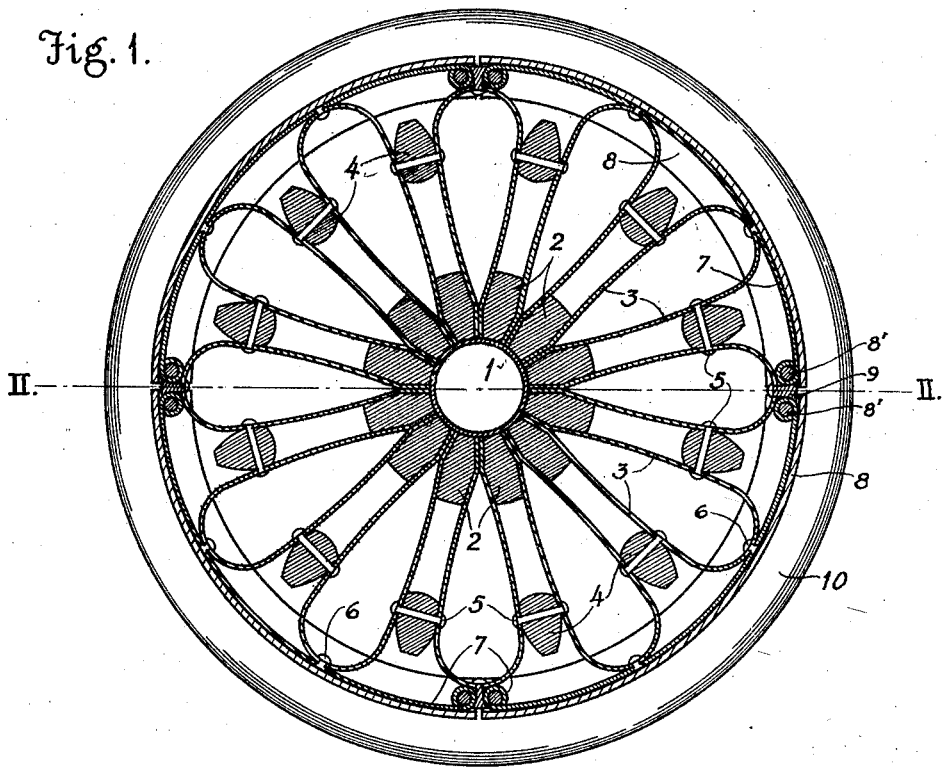
Fig. 1 is a partly sectional side elevation of a wheel embodying the features of the present invention.
Figure 2:
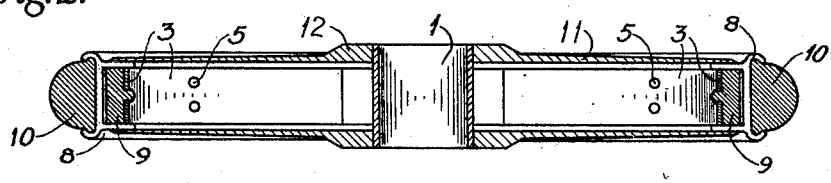
Fig. 2 is a transverse sectional view taken on the line II—II of Fig. 1.
Figure 3:
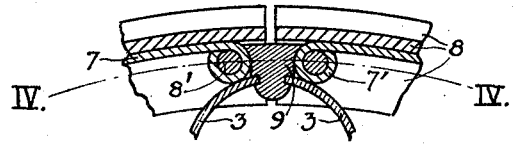
Fig. 3 is a fragmentary sectional side view, on an enlarged scale, illustrating the joints between the felly sections.
Figure 4:
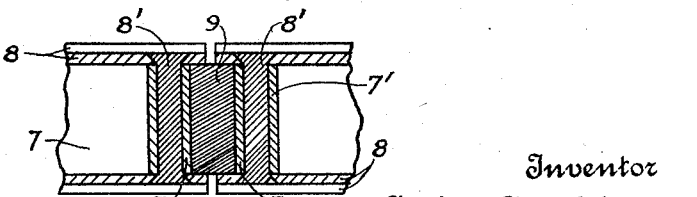
Fig. 4 is a sectional plan view taken approximately on the line IV—IV of Fig. 3.

Referring to the drawing, 1 designates the hub of the wheel, in which are secured in encircling relation thereto a plurality of radially extending members 2 the inner portions of which are wedge-shaped and are in abutting relation to each other, while their outer portions are separated so as to form approximately V-shaped openings between the members. The spokes of the wheel are formed by means of strips or sheets of metal 3 bent into a loop of ovate-acuminate formation, the acuminate end of each of said loops being wedged into one of the V-shaped openings between the members 2. Between the ovate portions of each pair of adjacent loops is disposed a wedge member 4, said member being secured to both loops of the pair by means of rivets 5. The members 3 are secured at their ovate ends by rivets 6 to an intermediate rim made up of a plurality of arc-shaped sections 7, each of which is rolled over at its opposite ends to form sleeves 7' the ends of adjacent sections being spaced apart to receive between them a wedge 9 the inner end of which is riveted to the ovate end of one of the spoke-forming members 3. A felly 8, also formed of a plurality of sections, is mounted on the rim 7, the sections of the felly having flanges which are secured to the rim 7 by means of rivets or bolts 8' passing through the sleeves 7' and through perforations in said flanges, said felly being formed to receive a solid tire 10. A pair of disks 11 having thickened central portions or bosses 12 may be secured on the hub at opposite sides of the wheel, thereby entirely enclosing the same and excluding dust therefrom.

A wheel constructed in the manner herein described is well balanced and elastic to the maximum degree, whereby the comfort of riders is considerably increased.

I claim:

A vehicle wheel, comprising in combination a hub, a plurality of wedge shaped members secured to the hub in encircling relation thereto, a plurality of sheet metal members each bent to form a loop of ovate-acuminate form, the acuminate end of each of said loops being wedged between a pair of said wedge-shaped members, a plurality of felly-forming sections bolted to said loops at their ovate ends and wedges secured to adjacent loops between the ovate portions of said loops.

In testimony whereof I have signed my name to this specification.

ANDRÉ GAUTHIER.